(12) United States Patent
Cui

(10) Patent No.: US 10,288,315 B2
(45) Date of Patent: May 14, 2019

(54) STRAIGHT FIN TUBE WITH BENDED FINS CONDENSING HEAT EXCHANGER

(71) Applicant: SUZHOU CQ HEAT EXCHANGER CO., LTD, SIP Jiangsu Province (CN)

(72) Inventor: Shuqing Cui, Fitchburg, WI (US)

(73) Assignee: SUZHOU CQ HEAT EXCHANGER CO., LTD, Jiangsu Province (CN)

( * ) Notice: Subject to any disclaimer, the term of this patent is extended or adjusted under 35 U.S.C. 154(b) by 0 days.

(21) Appl. No.: 15/787,060

(22) Filed: Oct. 18, 2017

(65) Prior Publication Data
US 2018/0058718 A1 Mar. 1, 2018

Related U.S. Application Data

(63) Continuation-in-part of application No. 14/356,533, filed as application No. PCT/CN2013/083871 on Sep. 21, 2013, now abandoned.

(30) Foreign Application Priority Data

Sep. 21, 2012 (CN) .......................... 2012 1 0353552

(51) Int. Cl.
*F24H 8/00* (2006.01)
*F24H 1/14* (2006.01)
*F24H 1/43* (2006.01)
*F24H 1/44* (2006.01)
*F24H 9/00* (2006.01)

(52) U.S. Cl.
CPC .............. *F24H 8/003* (2013.01); *F24H 1/145* (2013.01); *F24H 1/43* (2013.01); *F24H 1/445* (2013.01); *F24H 9/0026* (2013.01); *Y02B 30/104* (2013.01)

(58) Field of Classification Search
CPC ................................ F24H 1/145; F24H 8/003
USPC .............. 165/172, 182; 122/184; 126/110 R
See application file for complete search history.

(56) References Cited

U.S. PATENT DOCUMENTS 3,780,797 A * 12/1973 Gebelius ................. F28D 1/053
165/128
4,366,778 A * 1/1983 Charrier .................. F24H 1/403
122/18.4
4,658,762 A * 4/1987 Kendall .................... C10G 9/20
122/18.4

(Continued)

FOREIGN PATENT DOCUMENTS

CN 102226512 A * 10/2011

*Primary Examiner* — Avinash A Savani
*Assistant Examiner* — Aaron H Heyamoto
(74) *Attorney, Agent, or Firm* — Baker & Hostetler LLP

(57) ABSTRACT

A forced convection fin tube condensing heat exchanger for supplying heat includes a shell, burner and fin tubes bundle. The burner is at the top of the shell, circular fin tubes bundle installed around the burner tightly, circularly and coaxially. The flue channel which is formed by the shell and a row of fin tubes bundle is below the burner. The flue flows along the flue channel to flue outlet. There are front and rear water manifolds at the two ends of the fin tubes. Water baffles inside the rear water manifold divide the rear water manifold into water inlet and outlet areas. The water enters the small portion of circular fin tubes bundle from water inlet area, through the front water manifold, back to the water outlet area via the main portion of the circular fin tubes bundle. The use of bent fin tube to improves efficiency.

10 Claims, 8 Drawing Sheets

(56) References Cited

U.S. PATENT DOCUMENTS 6,050,328 A * 4/2000 Shikazono ............ F28D 1/0477
165/121
2006/0219395 A1* 10/2006 Le Mer .................... F24H 1/43
165/163

* cited by examiner

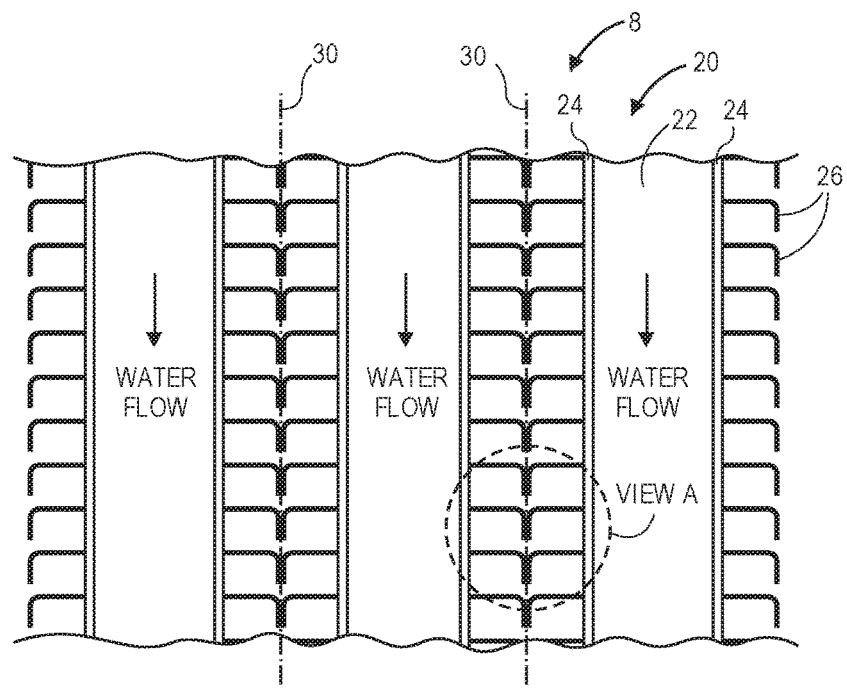
FIG. 17
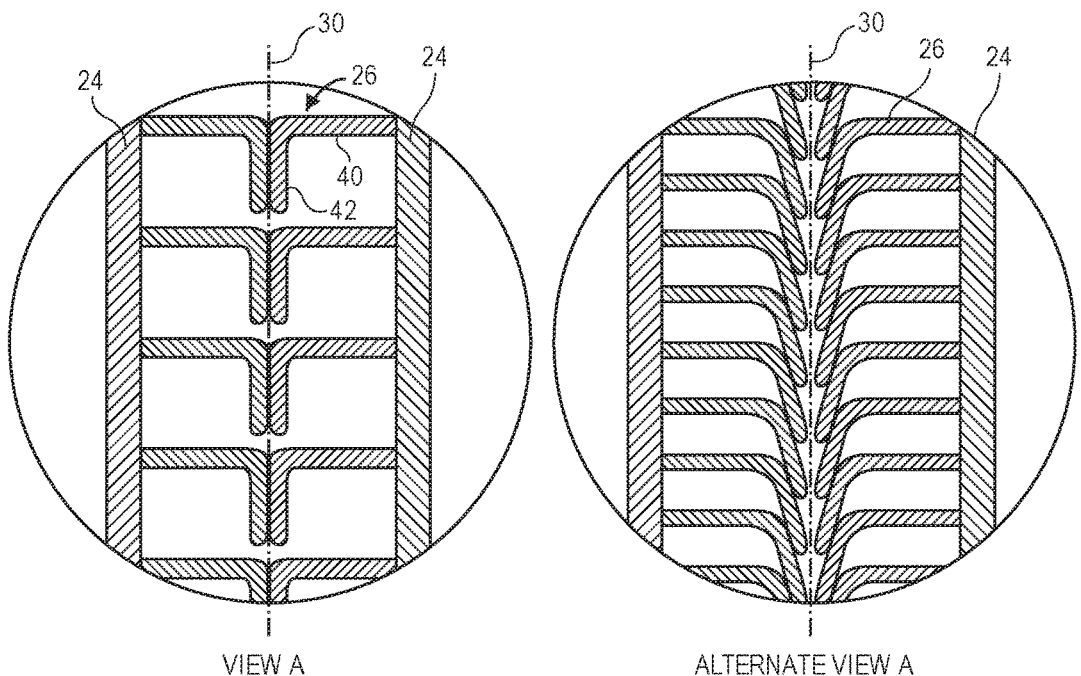
VIEW A
FIG. 18
ALTERNATE VIEW A
FIG. 19

STRAIGHT FIN TUBE WITH BENDED FINS CONDENSING HEAT EXCHANGER

CROSS REFERENCE TO RELATED APPLICATIONS

This application is a Continuation in Part application of U.S. patent application Ser. No. 14/356,533, filed on May 6, 2014 which is a national stage application and claims priority to PCT/CN2013/083871, filed on Sep. 21, 2013, which claims priority to CN 201210353552.1, filed on Sep. 21, 2012, the disclosures of which are incorporated herein by reference in their entireties.

FIELD OF THE INVENTION

This invention relates generally to equipment in the heating industry field. More particularly, the invention is related to a forced convection straight fin tube condensing heat exchanger for supplying heat.

BACKGROUND OF THE INVENTION

As far back as the Middle East oil crisis in the in 20th century, to save the energy, the high efficient condensing boiler was developed in Europe. The outstanding feature of the boiler is that the efficiency is 10% higher than the conventional boiler. Abundant water vapor in the flue is condensed and releases the latent heat of vaporization because the flue temperature can be decreased to below the dew point. This has the effect of energy saving. The condensing heat exchanger is developed and designed based on the principle of the condensing boiler.

The available heat from the combustion flue gas includes two parts: one is the sensible heat (e.g., the sensed heat) in the flue; the other part is the latent heat of water vapor in the flue. The conventional boiler has very high flue temperature because of the limitation of the structure. Therefore only sensible heat can be utilized. However, condensing boiler can not only use sensible heat in the flue but also the latent heat because of the low flue temperature. In this way, the efficiency of the condensing boiler can be greatly increased. In order to absorb the energy in the high temperature flue and collect the condensing water in the low temperature flue, a two-stage heat exchanger is employed normally. The high temperature flue enters the main heat exchanger and then condensing heat exchanger in sequence; the water flows in an opposite direction, the water enters the condensing heat exchanger first, and then enters the main heat exchanger. The water absorbs the sensible heat from the combustion flue gas after absorbing the waste heat of the high temperature flue in the condensing heat exchanger. The flue temperature decreases to a very low temperature after the sensible and latent heat in the heat exchangers has been absorbed by the water. In order to vent the flue securely, the forced convection method is applied. At the same time, the forced convection makes the boiler water absorbs the sensible and latent heat as much as possible. Therefore, the condensing heat exchanger utilizes the energy in the flue which was lost. The effect of the condensing heat exchanger depends on how much the waste energy is used.

The flue gas is normally in an overheated state before entering the condensing heat exchanger. It becomes saturation gradually as the flue temperature decreases and water vapor condenses. According to the test result, the flue at the condensing heat exchanger outlet is close to saturation status when the flue temperature is around 50° C. How close to the saturation status depends on the composition of the flue, the structure of the heat exchanger and heat transfer process. The testing result shows there are still some dead zones or short-circuit in the flue path. It decreases the heat exchanging efficiency.

The heat exchanger of the conventional (non-condensing) boiler is made by carbon steel or cast iron. The flue temperature is higher than 150° C. normally. The heat exchanger is not designed to absorb the sensible and latent heat when the water vapor condensing, and there is no condensate.

The condensing boiler is high efficient boiler with the features of energy saving and environmental protection. It is the future of the boiler industry and has been widely used. The life the condensing boiler will be shortened significantly if the carbon steel or cast iron is used because the boiler generates a lot of acid condensing water. So the material of the condensing heat exchanger should be stainless steel or cast aluminum. At present, most condensing heat exchangers are made with stainless steel tube or cast aluminum.

It is a proven technology to make cast aluminum heat exchanger, but the capacity is limited. It is very difficult to make the big cast aluminum parts. Typically, the bigger the cast, the higher the mold cost, the more complex manufacturing process and the higher scrap rate.

The efficiency can be around 96% maximally by using stainless steel or cast aluminum.

There will be no condensing water if the return water temperature is higher than 60° C. At this point, only the sensible heat in the flue can be saved. The heat efficiency of the non-condensing boiler is only around 87%.

The air pre-heater is applied in the large boiler in power stations normally. There is no such application in the heating boiler.

The conventional heat exchangers are designed according to the requirements from the different customers and the sizes of the heat exchangers are varied very much according to these requirements. Because there are a lot of components involved in the manufacture of heat exchangers, manufacturing many sizes of heat exchangers is not good practice for mass production.

While conventional heat exchangers have relatively good performance, there is still room for significant improvements in performance. A specific list of technical problems in need of improvement include: dead zones of flue flow and insufficient heat exchanging because of the poor heat exchanger structure design; increase the flue side heat transfer surface and efficiency by improving the heat transfer structure; to make the size smaller under the same heat transfer output; to integrate an air pre-heater into the heat exchanger to get the opportunity of third heat exchanging; increase the temperature of the inlet air; and decrease the flue temperature further. Accordingly, there is a need in the art to improve the heat exchanger.

SUMMARY OF THE INVENTION

The foregoing needs are met, to a great extent, by the present invention, wherein aspects of a heat exchanger are provided.

An embodiment of the present invention pertains to a forced convection fin tube condensing heat exchanger for supplying heat. The forced convection fin tube condensing heat exchanger includes a shell, a burner, a group of fin tubes in the shell, a water inlet, a water outlet, a flue outlet on the shell, and a connector between the burner and air/gas mixture. The burner is under the shell. A set of fin tubes are installed around the burner tightly and coaxially. The flue channel is formed by the shell and a row of fin tubes below the burner. The flue gas flows along the flue channel to flue outlet. There are front water manifold and back water manifold at the two ends of the fin tubes. The water baffles inside the rear water manifold divide the rear water manifold into water inlet area and outlet area. The water enters the small portion of circular fin tubes coaxed with burner and a row of fin tubes above the flue channel through water inlet area, then arrives at the front water manifold, and then return to the water outlet area on the rear water manifold through the main portion of circular fin tubes.

A preferred option of the forced convection fin tube condensing heat exchanger for supplying heat is characterized by water baffles inside the back water manifold divide the rear water manifold into water inlet area and outlet area. The water enters the small portion of circular fin tubes coaxed with burner and a row of fin tubes above the flue channel through water inlet area, then arrives at the front water manifold, and then return to the water outlet area on the back water manifold through the main portion of circular fin tubes.

A preferred option of the forced convection finned-tube condensing heat exchanger for supplying heat is characterized by water baffles inside the rear water manifold divide the rear water manifold into water inlet area and outlet area. The circular fin tubes have the same diameter with the row of fin tubes above the flue channel. The quantity of the fin tubes connected to the water inlet area roughly equals to the quantity of the fin tubes connected to the water outlet area. If the circular fin tubes have a different diameter with the row of fin tubes above the flue channel, the sum of the cross section area of the fin tubes connected to the water inlet area shall roughly equals to the sum of the cross section area of the fin tubes connected to the water outlet area.

A preferred option of the forced convection fin tube condensing heat exchanger for supplying heat is characterized by making the fins bent for some angles along with the tube axial by bending or squeezing, and to arrange the fin tubes next to each other closely and tightly.

A preferred option of the forced convection fin tube condensing heat exchanger for supplying heat is characterized by flue baffles outside the circular fin tubes around the burner.

A preferred option of the forced convection fin tube condensing heat exchanger for supplying heat is characterized by the cross section of the flue baffle is "V" type with radian, fitting with the fins of the fin tubes. The interfaces of the fin tubes in circle are staggered with the openings between the flue baffles.

A preferred option of the forced convection fin tube condensing heat exchanger for supplying heat is characterized by the flue baffles being under the row of fin tubes which are located above flue channel and below the burner. The cross section of the flue baffles is "V" type with radian, fitting with the fins of fin tubes. The interface of the fin tubes in the row are staggered with the openings between the flue baffles.

A preferred option of the forced convection fin tube condensing heat exchanger for supplying heat is characterized by an air pre-heater being disposed inside the flue channel. The air pre-heater is located inside and along the flue channel, and connected with air inlet. The flue exhaust is a 4-way connector, the flue exhaust on the top, the condensate outlet at the bottom and the air inlet in the middle.

A preferred option of the forced convection fin tube condensing heat exchanger for supplying heat is characterized by the air pre-heater being disposed inside the flue channel is one or several cuboids or cylinder air inlet tube.

A preferred option of the forced convection fin tube condensing heat exchanger for supplying heat is characterized by the burner being disposed under the shell. A set of fin tubes are installed around the burner tightly and coaxially. The flue channel is formed by the shell and a row of fin tubes below the burner. The flue gas flows along the flue channel to flue outlet. There are front water manifold and rear water manifold at the two ends of the fin tubes. The water baffles inside the rear water manifold divide the rear water manifold into water inlet area and outlet area. The water enters the small portion of circular fin tubes coaxed with burner and a row of fin tubes above the flue channel through water inlet area, then arrives at the front water manifold, and then return to the water outlet area on the rear water manifold through the main portion of circular fin tubes.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 17 is a cross sectional view of the forced convection fin tube condensing heat exchanger from FIG. 8.

FIG. 18 is a detailed cross sectional view of the forced convection fin tube condensing heat exchanger from FIG. 17.

FIG. 19 is an alternative detailed cross sectional view of the forced convection fin tube condensing heat exchanger from FIG. 17.

DETAILED DESCRIPTION

Figure 1:
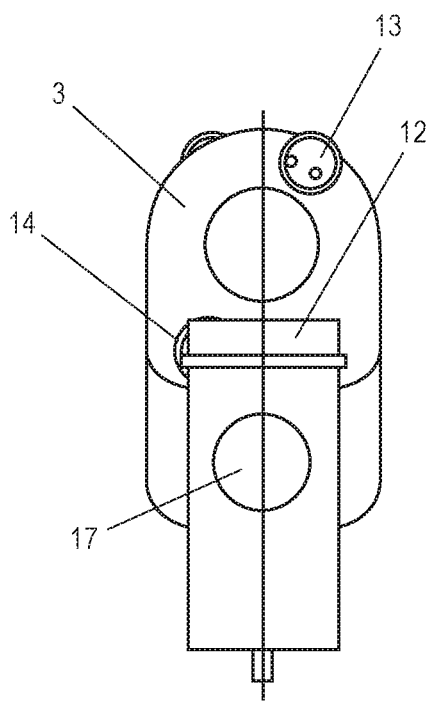
FIG. 1 is a right side view of a forced convection fin tube condensing heat exchanger for supplying heat according to an embodiment.

Various embodiments of the present invention provide for an improved heat exchanger that is configured to provide greater efficiency. In some embodiments, the integral structure layout is able to increase the heat exchanger efficiency. In some aspects the heat exchanger has a counter flow design with two-stage heat exchanger. The burner is on the top and the flue outlet on the bottom. After burning, the combustion flue gas flows through the group of fin tubes around the burner and flue baffles located outside these tubes first, then it flows through the row of fin tubes above the flue channel and the flue baffles under these tubes. And then the flue gas flows out from the flue outlet along the flue channel and counter flow with inlet air. The water inlet is close to the flue outlet at the bottom, and the water outlet is on the top of the heat exchanger. The water flows through inlet, fin tubes, and the cavities connected to the upper and lower fin tube bundles at both ends, such as front and rear water manifolds, and then out from the outlet. The boiler water supply temperature is higher than exhaust flue temperature by applying this type of count flow structure. In this way, the heat transfer efficiency and the amount of heat are both able to be increased.

In some aspects, the water baffles inside the rear water manifold divide the rear water manifold into water inlet area and outlet area. The water enters the small portion of circular fin tubes bundle coaxed with burner and the row of fin tubes bundle above the flue channel through water inlet area. These tubes are called the secondary or condensing heat exchanger. The water arrives at the front manifold, and then returns to the water outlet area on the rear water manifold through the main portion of circular fin tubes bundle, called the first or primary heat exchanger. In such way, all fin tubes are the same. It is an advantage of some embodiments described herein that the same key components may be used to build heat exchangers in mass production, decreasing the production difficulty and saving the production cost. Meanwhile, examples described herein decrease the flame temperature by controlling the distance between the flame and the surface of the heat exchanger, which in turn reduce nitric oxide (NOx) levels to below 30 parts per million (PPM).

The fin tubes with the bent fins, fabricated in an additional process are able to increase the heat exchange efficiency significantly in some aspects. The fin tube is as the basic element in the forced convection condensing heat exchanger. The heat transfer surface at flue side is increased by adding the fins on the external of the heat exchanger tube. The enhanced heat transfer at flue side increases the heat exchange efficiency, and makes the whole heat exchanger smaller. By the additional manufacturing process on the fins, for example bending, squeezing or cutting, the distance between tubes could be made smaller. Therefore, this makes flue gas have more contact with tubes, adds gas flue turbulences, increase heat transfer and heat exchanger efficiency, which in turn allows the heat exchanger to be made smaller for a given heat exchange capacity.

There are flue baffles outside the circular fin tubes bundle around the burner and flue baffles under the row of fin tubes bundle. It is good to eliminate the "dead zone" on the flue path and improve the flue distribution on the shell side. In some aspects, the flue baffles force the flue gas flow along the fins and cross bare tubes very closely, therefore, it enhance the heat transfer, and improve flue flow distribution at the shell side. The "dead zone" and "short circuit" at the flue flow path is decreased very much.

Another additional device is the air pre-heater provided in some examples. This air pre-heater can also increase the efficiency. In some aspects, the air pre-heater is integrated inside the flue channel of the heat exchanger. When the outdoor temperature is below −20° C. in the winter, the waste heat in the flue warms the coming air. Meanwhile, it decreases the exhaust flue temperature further, and the efficiency of the boiler could reach 98% or more.

Preferred embodiments of the invention will now be further described with reference to the drawing figures, in which like reference numerals refer to like parts throughout. It should be understood, however, that these figures are used to demonstrate and explain the invention, but not to set the limitation to the invention.

As shown in FIG. 1 to FIG. 16, the invention includes: Front water manifold 1; front shell 2; shell 3; circular fin tubes bundle 4, flue baffles outside circular fin bundle 5, burner 6, flue baffles under a row of fin tubes bundle 7, a row of fin tubes bundle 8, rear water manifold 9, rear shell 10, air pre-heater 11, flue exhaust 12, water outlet 13, water inlet 14, flue channel 15, condensing water outlet 16, air inlet 17, water baffles 18.

Figure 2:
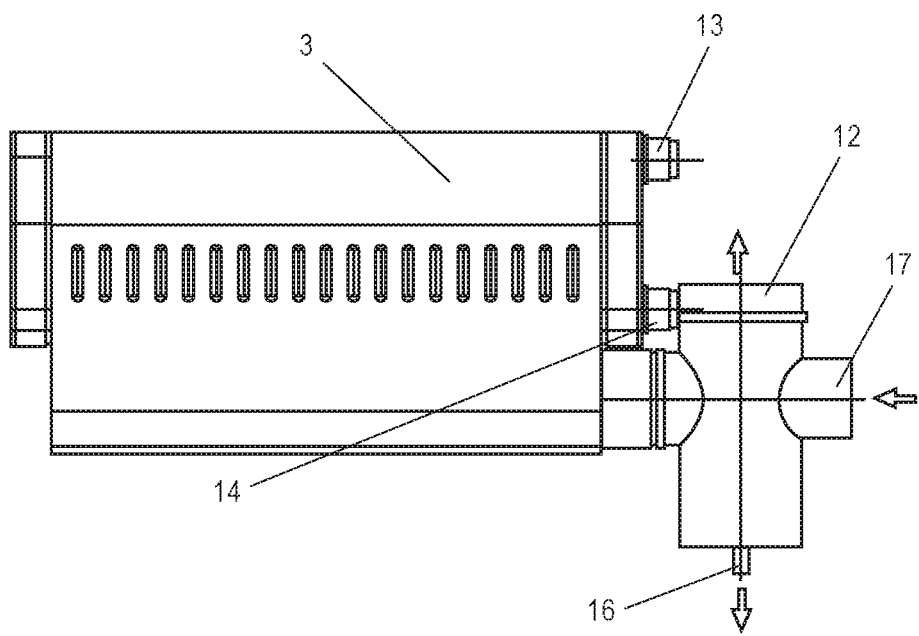
FIG. 2 is a front view of the forced convection fin tube condensing heat exchanger for supplying heat according to an embodiment.
Figure 3:
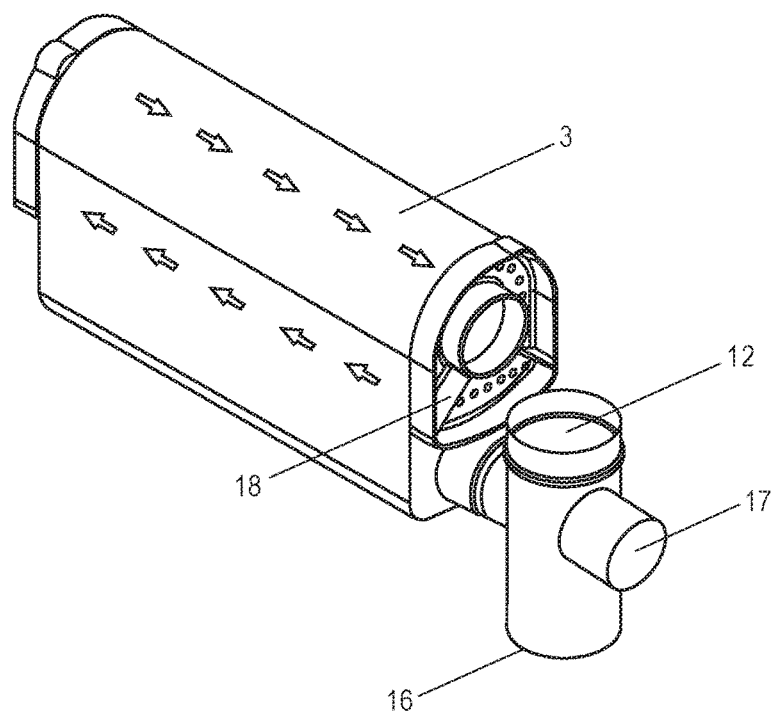
FIG. 3 is a perspective view of a forced convection fin tube condensing heat exchanger for supplying heat according to an embodiment.

Refer to FIG. 1 to FIG. 3; the invention describes one case of a forced convection fin tube condensing heat exchanger for supplying heat. As shown in FIGS. 1, 2 and 3, a forced convection fin tube condensing heat exchanger for supplying heat includes shell 3, burner 6, circular fin tubes bundle 4 and a row of fin tubes bundle 8. There is an elliptic shell 3 which is welded with two pieces of "U" type plates. The front shell 2 and rear shell 10 are welded to the elliptic shell. Two pieces of insulation plates are installed inside the front shell 2 and rear shell 10.

As shown in the figures, there is the front water manifold 1 outside the front shell 2 and there is the rear water manifold 9 outside the rear shell 10. There is a water outlet 13 and a water inlet 14 on the rear water manifold 9. And there is also a flue exhaust 12 on the shell 3. The flues exhaust 12 is a 4-way connector. It is the flue exhaust 12 on the top, condensate outlet 16 on the bottom, and the air inlet 17 of the air pre-heater 11 in the middle.

Figure 4:
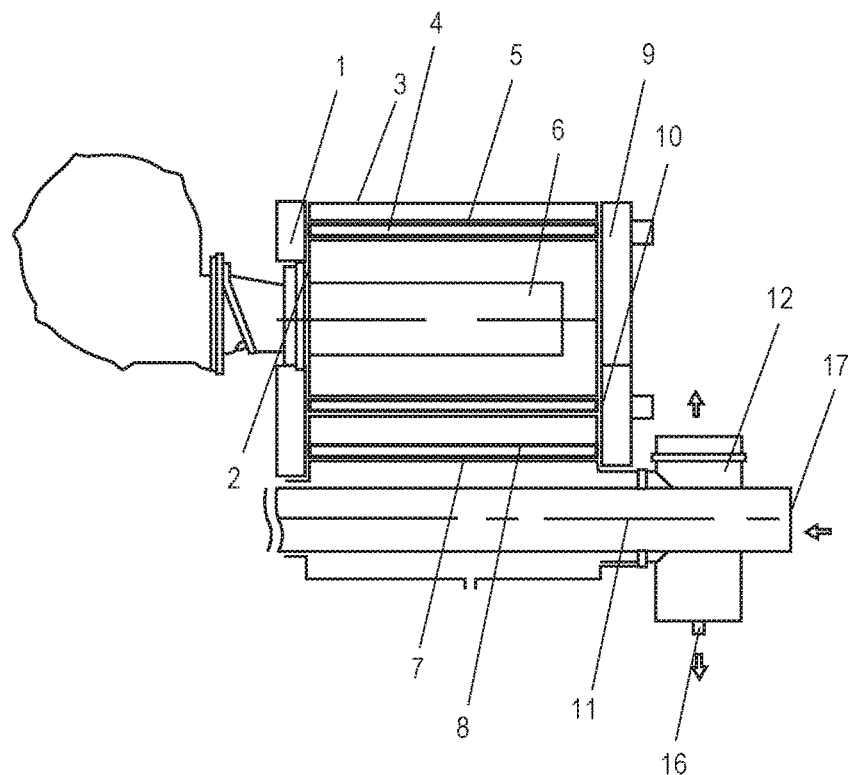
FIG. 4 is a sectional view of the forced convection fin tube condensing heat exchanger for supplying heat according to an embodiment.

FIG. 4 is the cross section view of an embodiment, which is a forced convection fin tube condensing heat exchanger for supplying heat. In this case, the forced convection fin tube condensing heat exchanger for supplying heat includes shell 3, burner 6 located inside the shell 3 and many fin tubes. There are water inlet 14 and outlet 13 located on the rear water manifold 9, and flue exhaust 12 on the shell 3. The burner 6 is connected to the air and gas inlet mixer. The burner 6 is inside the shell 3 and positioned on the top. A set of circular fin tubes bundle 4 is around the burner 6 coaxially, and these tubes are tight close next to each other. Both ends of the circular fin tubes bundle 4 and a row of fin tubes bundle 8 are welded to the front shell 2 and rear shell 10, as well as welded to the front water manifold 1 and rear water manifold 9. There is a group of outer flue baffle 5 outside the circular fin tubes bundle 4 which is around the burner 6. The flue channel 15 is formed by the shell 3 and a row of fin tubes bundle 8, and located below of the burner 6. The flue goes out from the flue exhaust 12 through the flue channel 15. There is a group of under flue baffles 7 located under the row of fin tubes bundle 8 inside in the flue channel 15.

At the two ends of the fin tubes bundle, there are front water manifold 1 and rear water manifold 9. In the rear water manifold 9, there are water baffles 18, which divides the rear water manifold 9 into two parts, water inlet area and outlet area.

If the circular distributed fin tubes have the same diameter with the row of fin tubes which forms the flue channel 15, the quantity of the fin tubes connected to the water inlet area is roughly same as the quantity connected to the outlet area.

If the circular distributed fin tubes have the different diameter with the row of fin tubes which forms the flue channel 15, then the sum of the cross section area of the fin tubes connected to the water inlet area roughly equals to the sum of the cross section area of the fin tubes connected to the water outlet area.

There are one or several cuboids' or cylindrical air pre-heater tubes 11 inside the flue channel 15. The air pre-heater 11 connects air inlet after going through the flue channel 15. The flue exhaust 12 is a 4-way connector. The flue exhaust 12 is on the top, condensate outlet 16 is at the bottom, and the air inlet 17 is located in the middle of the 4-way connector 12.

Figure 5:
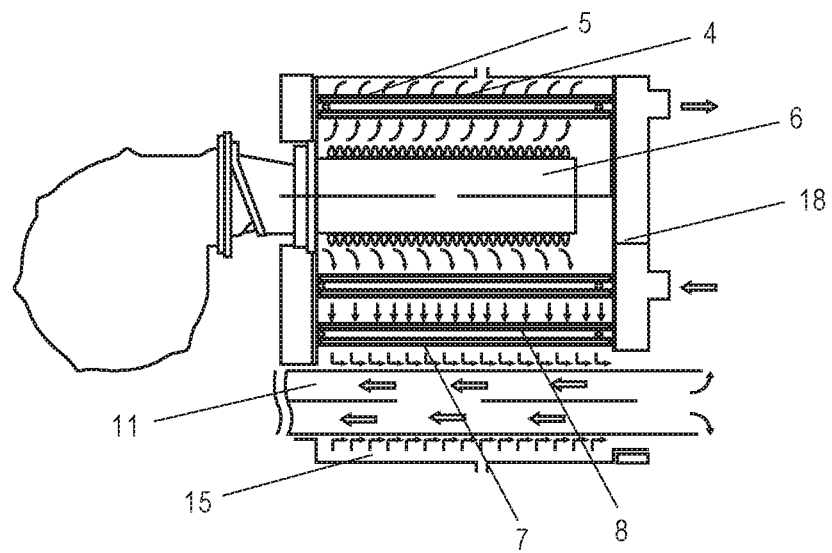
FIG. 5 is an operation (flow path) view of the forced convection fin tube condensing heat exchanger for supplying heat according to an embodiment.

As shown in FIG. 5, it demonstrates the operation principle of an embodiment, a forced convection fin tube condensing heat exchanger for supplying heat. We can learn the following items from this figure very clearly: the circular fin tubes bundle 4 is above the row of fin tubes bundle 8, and they are in parallel; the burner 6, which connects the air and gas inlet, is installed inside the circular fin tubes bundle 4 coaxially; under the circular fin tubes bundle 4, the flue channel 15 is formed by the shell 3 and the row of fin tubes bundle 8.

Two stage heat exchanging method is applied in an embodiment. The heat exchanger uses the counter flow structure. The high temperature flue flows downstream through fin tubes bundle 4 and a row fin tubes bundle 8. However, the water flow is opposite to the direction of the flue. It goes through the row of fin tubes bundle 8 firstly, and then the circular fin tubes bundle 4. The air pre-heater 11 is located in the flue channel 15. The air gains the heat from the flue further. Therefore, the temperature of the air, which enters the combustion chamber, is increased; and at the same time, the flue temperature can be further reduced.

In this case, the water flows through water inlet 14, front water manifold 1, fin tubes, rear water manifold 9 and water outlet 13, and heated up through this circuit.

The water enters a small portion of the circular fin tubes bundle 4 and the row of fin tubes bundle 8 through the water inlet area, and arrives at the front water manifold 1. Then the water flows to the water outlet area in the rear water manifold 9 through the main portion of the circular fin tubes bundle 4. The same fin tubes can be used by installing water baffle in the rear water manifold and utilizing a portion of circular fin tubes bundle. Therefore, the number of different parts is reduced. Of course, it is okay not to utilize the small portion of the circular fin tubes bundle. But, it may cause the negative impact to the size of the whole heat exchanger, the diameter of the fin tubes, the structure of the fin tubes bundles, the efficiency, and so on.

Figure 6:
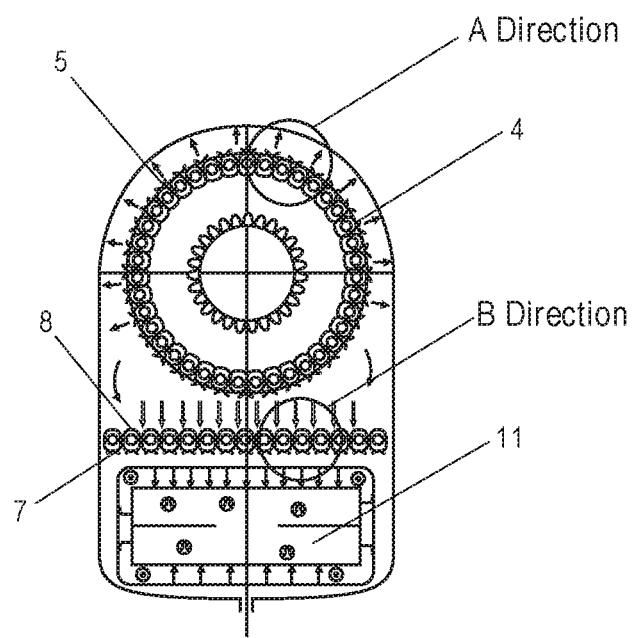
FIG. 6 is a right side sectional view of the forced convection fin tube condensing heat exchanger with an air pre-heater according to an embodiment.

As shown in FIG. 6, it is the right view to demonstrate the operation principle of an embodiment, a forced convection fin tube condensing heat exchanger for supplying heat. In this case, the flue channel 15 is formed by the lower part of the shell 3 and the row of fin tubes bundle 8. A cuboid air pre-heater tube is set inside. The water inlet tubes (first stage) include small portion of the circular fin tubes bundle 4 and the entire row of fin tubes bundle 8. The water outlet tubes (second stage) include the main portion of the circular fin tubes bundle 4. If the circular fin tubes have the same diameter with the row of fin tubes which forms the flue channel 15, the quantity of the fin tubes for the water inflow is same as the quantity of the fin tubes for the water outflow.

Figure 7:
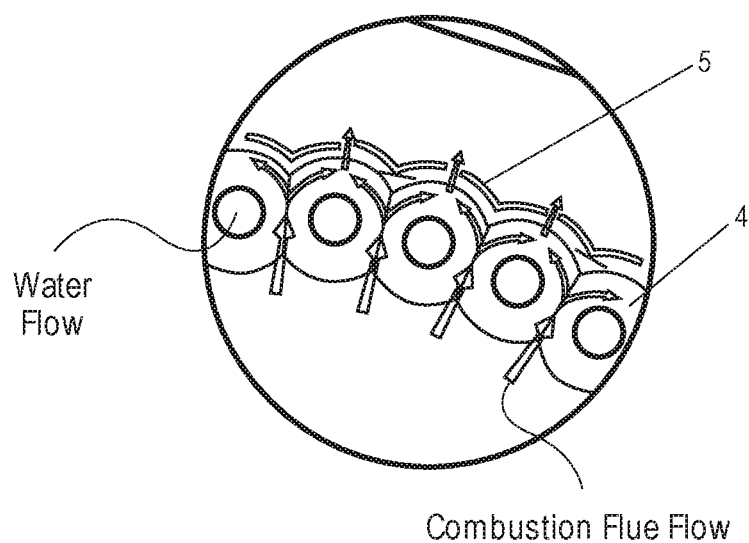
FIG. 7 is a detailed view A of the forced convection fin tube condensing heat exchanger for supplying heat according to an embodiment.
Figure 8:
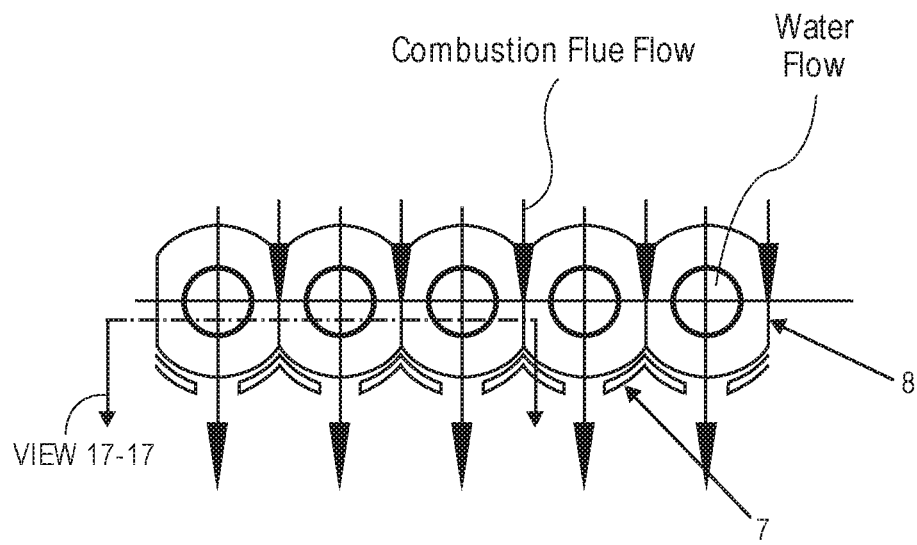
FIG. 8 is a detailed view B of the forced convection fin tube condensing heat exchanger for supplying heat according to an embodiment.

FIGS. 7 and 8 are detailed views A and B of an embodiment. As shown in FIG. 7, the outer flue baffles 5 are installed outside the circular fin tubes bundle 4 by spot welding. The outer flue baffles 5, which perfectly fit with the outside shape of the circular fin tubes bundle, is a long striped "V" type plate with radian cross section. The interfaces between fin tubes are staggered with the gaps of the outer flue baffles 5.

As shown in FIG. 8, there are under flue baffles 7 located at the bottom of the row of fin tubes bundle which forms the flue channel 15. The under flue baffles 7, which cross section is "V" type with radian, fit perfectly with the fin tubes. The interfaces between the fin tubes are staggered with the gaps of the under flue baffles 7.

The outer flue baffles 5 and under flue baffles 7 both guide the flue flow directions.

Figure 9:
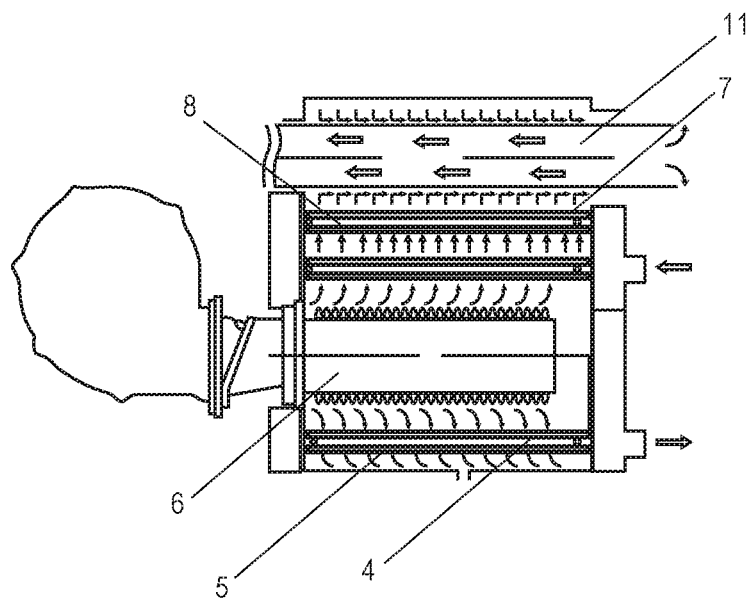
FIG. 9 is a sectional view of the forced convection fin tube condensing heat exchanger with the burner located at the bottom according to another embodiment.
Figure 10:
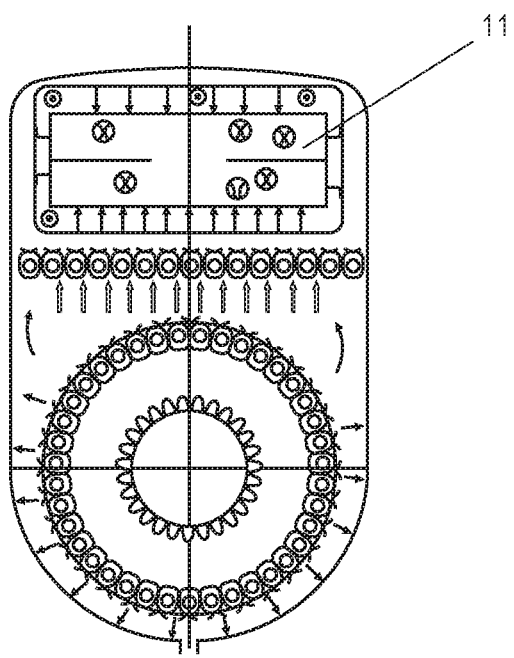
FIG. 10 is an operation (flow path) view of the forced convection fin tube condensing heat exchanger with the burner located at the bottom according to the embodiment of FIG. 9.

FIGS. 9 and 10 are views of another embodiment which is the sectional view of the forced convection fin tube condensing heat exchanger for supplying heat with the burner 6 located at the lower position. In this case, the burner 6 is at the lower part of the shell 3. A set of circular fin tubes bundles 4 installed around the burner 6 tightly and coaxially. The flue channel 15 which is formed by the shell 3 and a row of fin tubes bundle 8 located above the burner 6. The flue flows along the flue channel 15 to flue outlet 12. There are front water manifold 1 and rear water manifold 9 at both ends of the fin tubes. There are water baffles 18 inside the rear water manifold 9. The water baffles 18 divide the rear water manifold 9 into water inlet area and outlet area. The water enters the small portion of the circular fin tubes bundles and the entire row of fin tubes bundle above the flue channel through water inlet area, and arrives at the front water manifold 1. Then the water flows back to the water outlet area at the rear water manifold 9 through the main portion of the circular fin tubes bundle.

The high temperature flue flows upstream and passes through the circular fin tubes bundle 4, and the row of fin tubes bundle 8. The air pre-heater 11 located inside the flue channel 15 exchange heat with the flue.

Figure 11:
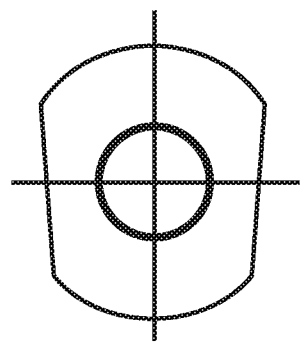
FIG. 11 is a front body view of the fin tube with bent fins for the circular fin tubes bundle according to an embodiment.
Figure 12:
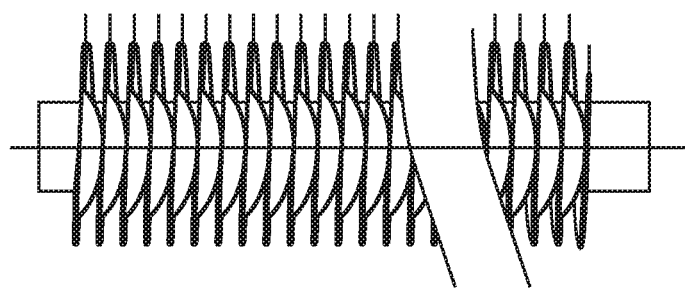
FIG. 12 is a left view of the fin tube with bent fins for the circular fin tube bundle according to an embodiment.

FIG. 11 is the main view of the treated fin tube for the circular fin tubes bundle in an embodiment. FIG. 12 is the side view of the treated fin tube. In an embodiment, the fins are bent or squeezed with 90 degree along with the tube axially, and two bending lines also form some angle. The direction and angle of bent fins can be adjusted appropriately according to the request of the fin tubes arrangement. Referring to FIG. 6, the treated fin tubes are arranged to form a circular fin tube bundle 4. According to the specific production requirements, the manufacturing process of bending or squeezing fins can be selected to reduce the distance between the tubes next to each other.

Figure 13:
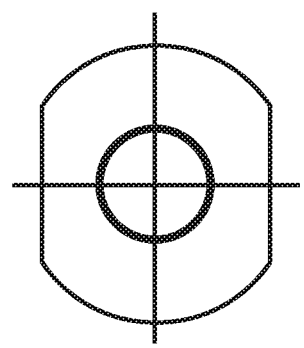
FIG. 13 is a front body view of the fin tube with bent fins for the row of fin tubes bundle according to an embodiment.
Figure 14:
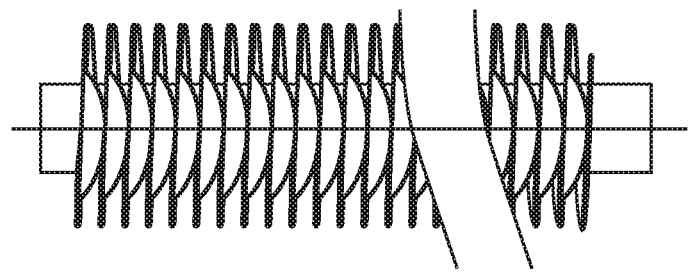
FIG. 14 is a left view of the fin tube with bent fins for the row of fin tubes bundle according to an embodiment.

FIG. 13 is the main view of the treated fin tube for the row of fin tubes bundle. FIG. 14 is the side view of the treated fin tube. In an embodiment, the fins are bent or squeezed with 90 degree along with the tube axially, and two bending lines are in parallel. As shown in FIG. 6, the treated fin tubes are arranged to form a row of fin tubes bundle 8.

Figure 15:
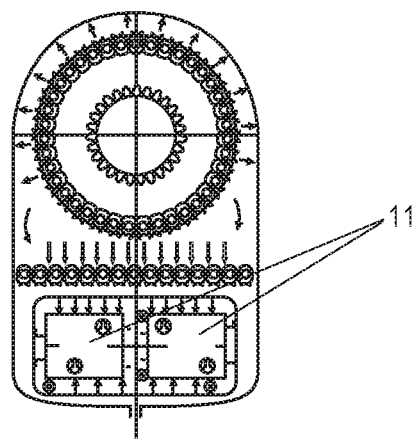
FIG. 15 is a right view of the forced convection fin tube condensing heat exchanger for supplying heat with an air pre-heater having two tubes according to the embodiment of FIG. 9.

FIG. 15 is the right side view of yet another embodiment, which is a forced convection fin tube condensing heat exchanger for supplying heat with two air pre-heater tubes. In this case: the burner 6 is at the top of the shell 3, a set of circular fin tubes bundle 4 installed around the burner 6 tightly, circularly and coaxially. The flue channel 15 which is formed by the shell 3 and a row of fin tubes bundle 8 is below the burner 6. The flue flows along the flue channel 15 to flue outlet 12. In the mentioned flue channel 15, there are two cuboid air pre-heater tubes 11. The air pre-heater connects the air inlet device after going through flue channel 15. There are front water manifold 1 and rear water manifold 9 at the two ends of the fin tubes. There is water baffle 18 inside the rear water manifold 9, and it 18 divides the rear water manifold 9 into water inlet area and outlet area. The water enters the small portion of the circular fin tubes bundle 4 and the entire row of fin tubes bundle 8 from water inlet area, and arrives at the front water manifold 1. Then the water flows back to the water outlet area at the rear water manifold 9 through the main portion of the circular fin tube bundle.

Figure 16:
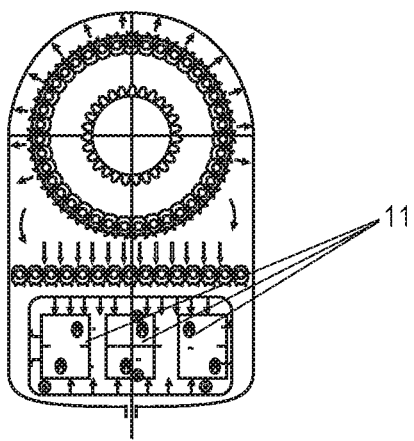
FIG. 16 is a right view of the forced convection fin tube condensing heat exchanger for supplying heat with an air pre-heater having three tubes or several tubes according to yet another embodiment.

FIG. 16 is the right side view of yet another embodiment, which is a forced convection fin tube condensing heat exchanger for supplying heat with three air pre-heater tubes. In this case: the burner 6 is at the top of the shell 3, a set of circular fin tubes bundle 4 installed around the burner 6 tightly, circularly and coaxially. The flue channel 15 which is formed by the shell 3 and a row of fin tubes bundle 8 is below the burner 6. The flue flows along the flue channel 15 to flue outlet 12. In the mentioned flue channel 15, there are three cuboid air pre-heater tubes 11. The air pre-heater connects the air inlet device after going through flue channel 15.

In conclusion, the purpose of some embodiments is to increase the heat transfer area and improve the structure of the heat transfer surface, therefore to increase heat exchange efficiency. The heat exchanger uses the bent fin tube as the basic element of the forced convection fin tube condensing heat exchanger for supplying heat. It enhances the heat exchange on the flue side and makes the whole heat exchanger smaller.

The flow of the flue is guided very close to the fins and tubes with the application of the outer flue baffles 5 and the under flue baffle 7. They improve shell side flue passes and velocity distribution, therefore enhance heat exchange. The "dead zone" and "short circuit" of the flue flow can be reduced very much. The air pre-heater 11 is integrated into the heat exchanger very clever. The wasted heat of the flue could warm the entered cold air, and at the same time the flue is cold down further. When the outdoor temperature is below −20° C. in winter, the efficiency could reach 98% or above.

Some key components are designed to be the same to minimize the number of parts in an embodiment. This will help the mass production, improve the manufacturing process and save the cost.

It shall point out that the demonstration cases above are only for explaining the technical schemes of the invention, not for limiting them. Although the detailed explanations are listed with only optimum cases in the invention, the technical persons in this field shall know that the technical scheme can be modified and replaced, but it does not separate from the spirit of the various embodiments described herein, and shall be included in the scope of the claims.

FIG. 17 is a cross sectional view of the forced convection fin tube condensing heat exchanger from FIG. 8 showing the row of fin tubes bundle 8. As shown in FIG. 17, the fin tubes bundle 8 includes a plurality of tubes 20. Each tube 20 includes an inside 22 to convey a flow of fluid, as indicated by the arrows. In addition, each of the tubes 20 includes side walls 24 that define the inside 22 and are configured to support a series of fins 26. In some embodiments, the fins 26 may be circular donut-shaped disks with an interior opening configured to accept the tube 20. Preferentially, the fins 26 are spiral wound about the tube 20 and affixed to the outside of the tube by welding, for example. Of note, each fin 26 is bent to form a bearing surface. The bend of the fins 26 may be on opposite sides of the tube 20 as shown in FIGS. 13 and 14. In this manner, the bearing surfaces may be pressed against one another at a bearing interface 30 and a series of such tubes 20 with respective bearing surfaces that bear one upon the next may form a planar array as in the row of fin tube bundle 8 shown FIGS. 8 and 17. Alternatively, the bend of the fins 26 may be disposed across the tube 20 from one another at an angle other than 180° as shown in FIGS. 6, 7, 11 and 12. In this manner, the bearing surfaces may be pressed against one another at a bearing interface 30 and a series of such tubes 20 with respective bearing surfaces that bear one upon the next may form a cylindrical array as in the flue baffles outside circular fin bundle 5 shown FIGS. 6 and 7.

To form the bent fins 26, the tube 20 may be drawn through a form, pressed between planar surfaces or rollers. It is an advantage of forming the bent fins 26 that the resulting bearing surfaces facilitate maintaining the row of fin tubes bundle 8 in a planar formation as well as maintaining the flue baffles outside circular fin bundle 5 in a cylindrical formation. It is another advantage of forming the bent fins 26 that the bear surfaces greatly strengthen the individual fins 26 relative to unbent fins.

FIG. 18 is a detailed cross sectional view of the forced convection fin tube condensing heat exchanger from FIG. 17. As shown in FIG. 18, the fins 26 include an axial portion 40 extending at 90° from the side wall 24. The fins 26 also include a bearing portion 42 that is perpendicular or 90° from the axial portion 40 and parallel relative to the side wall 24.

FIG. 19 is an alternative detailed cross sectional view of the forced convection fin tube condensing heat exchanger from FIG. 17. As shown in FIG. 19, the fins 26 are bent at less than 90° and the bent portions overlap adjacent bent portions. This overlapping or scale-like arrangement may further facilitate strengthening the fins 26. In addition, the overlapping ends of the fins 26 may generate a texture that provides a gripping interaction at the bearing interface 30 and further stabilizes array of tubes 20.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A forced convection fin tube condensing heat exchanger for supplying heat, comprising:
    a shell;
    a burner disposed at an upper portion of the shell, the burner being fluidly connected to an air/gas inlet;
    a plurality of fin tubes disposed in the shell, each of the plurality of fin tubes includes a multitude of fins disposed along a tube, each of the multitude of fins having two opposing edge portions bent at 90° relative to a body portion of the respective fin to generate a multitude of bent portions, the bent portions being aligned to generate two bending lines, the fin tubes being arranged tightly with the respective bent portions of the fins on adjacent fin tubes directly butting against one another and the plurality of fin tubes being disposed coaxially about the burner;
    a water inlet disposed outside the shell;
    a water outlet disposed outside the shell;
    a flue outlet disposed outside the shell;
    a flue channel defined by the shell and a row of fin tubes below the burner, wherein combustion flue gasses flow from the flue channel to a flue outlet;
    a front water manifold disposed at a first end of the plurality of fin tubes;
    a rear water manifold at a second end of the plurality of fin tubes; and
    a plurality of water baffles disposed inside the rear water manifold, the plurality of water baffles being configured to divide the manifold into a water inlet area and a water outlet area, wherein a flow of water enters a first portion of the plurality of fin tubes through the water inlet area, then the flow of water flows through the front water manifold, and then the flow of water flows to the water outlet area on the rear water manifold through a second portion of the plurality of fin tubes.

2. The forced convection fin tube condensing heat exchanger according to claim 1, wherein the first portion of the plurality of fin tubes is relatively less numerous than the second portion of the plurality of fin tubes.

3. The forced convection fin tube condensing heat exchanger according to claim 1, wherein the water baffles inside the rear water manifold divide the rear water manifold into a water inlet area and a water outlet area, the plurality of fin tubes have the same diameter with the row of fin tubes above the flue channel, a first quantity of the plurality of fin tubes connected to the water inlet area roughly equals to a second quantity of the plurality of fin tubes connected to the water outlet area, if the plurality of fin tubes have a different diameter with the row of fin tubes above the flue channel, a sum of the cross section area of the first quantity of the plurality of fin tubes connected to the water inlet area is roughly equals to the sum of the cross section area of the second quantity of the plurality of fin tubes connected to the water outlet area.

4. The forced convection fin tube condensing heat exchanger according to claim 1, wherein the fins are bent to be parallel with the tube axis by bending or squeezing and all the fin tubes are in contact with adjacent ones of the fin tubes.

5. The forced convection fin tube condensing heat exchanger according to claim 1, further comprising:
    a plurality of outer flue baffles disposed outside the circular fin tubes around the burner.

6. The forced convection fin tube condensing heat exchanger according to claim 5, wherein the outer flue baffle include a "V" type cross section with a radiused portion configured to mate with ones of the fins of the fin tubes and wherein the interfaces of the fin tubes disposed in a circle are staggered with the openings between the flue baffles.

7. The forced convection fin tube condensing heat exchanger according to claim 1, further comprising:
    a plurality of lower flue baffles disposed under the row of fin tubes which are located above the flue channel and below the burner, wherein the lower flue baffles include a "V" type cross section with a radiused portion configured to mate with ones of the fins of the fin tubes and wherein the interface of the fin tubes in the row are staggered with the openings between the flue baffles.

8. The forced convection fin tube condensing heat exchanger according to claim 1, further comprising:
    an air pre-heater disposed inside the flue channel, wherein the air pre-heater is located inside and along the flue channel and connected with an air inlet, the flue exhaust being a 4-way connector, wherein the flue exhaust is disposed on a top portion of the forced convection fin tube condensing heat exchanger; and
    a condensate outlet disposed at a bottom portion of the forced convection fin tube condensing heat exchanger and the air inlet being disposed in a middle portion of the forced convection fin tube condensing heat exchanger.

9. The forced convection fin tube condensing heat exchanger according to claim 8, wherein the air pre-heater disposed inside the flue channel includes one or more cuboidal or cylindrical air inlet tubes.

10. A forced convection fin tube condensing heat exchanger comprising:
    a shell;
    a burner disposed at a lower portion of the shell, the burner being fluidly connected to an air/gas inlet;
    a plurality of fin tubes disposed in the shell, each of the plurality of fin tubes includes a multitude of fins disposed along a tube, each of the multitude of fins having two opposing edge portions bent at 90.degree. relative to a body portion of the respective fin to generate a multitude of bent portions, the bent portions being aligned to generate two bending lines, the fin tubes being arranged tightly with the respective bent portions of the fins on adjacent fin tubes directly butting against one another and the plurality of fin tubes being disposed coaxially about the burner;

a water inlet disposed outside the shell; a water outlet disposed outside the shell;

a flue outlet disposed outside the shell;

a flue channel defined by the shell and a row of fin tubes below the burner, wherein combustion flue gasses flow from the flue channel to a flue outlet;

a front water manifold disposed at a first end of the fin tubes;

a rear water manifold at a second end of the fin tubes; and a plurality of water baffles disposed inside the rear water manifold, the plurality of water baffles being configured to divide the manifold into a water inlet area and a water outlet area, wherein a flow of water enters a first portion of the plurality of fin tubes through the water inlet area, then the flow of water flows through the front water manifold, and then the flow of water flows to the water outlet area on the rear water manifold through a second portion of the plurality of fin tubes.

* * * * *